(12) United States Patent
Nagle et al.

(10) Patent No.: US 6,171,850 B1
(45) Date of Patent: Jan. 9, 2001

(54) INTEGRATED DEVICES AND SYSTEMS FOR PERFORMING TEMPERATURE CONTROLLED REACTIONS AND ANALYSES

(75) Inventors: Robert Nagle, Mountain View; Robert S. Dubrow, San Carlos, both of CA (US)

(73) Assignee: Caliper Technologies Corp., Mountain View, CA (US)

(*) Notice: Under 35 U.S.C. 154(b), the term of this patent shall be extended for 0 days.

(21) Appl. No.: 09/264,285

(22) Filed: Mar. 8, 1999

(51) Int. Cl.[7] ..................................................... C12M 1/38

(52) U.S. Cl. ................................ 435/286.1; 435/287.2; 435/288.4; 435/288.5; 435/303.1; 422/102

(58) Field of Search ........................... 435/6, 91.2, 287.2, 435/286.1, 288.4, 303.1, 305.2, 305.3, 809, 288.5; 204/451, 453, 455, 601, 604, 605; 219/428, 436, 437, 438, 540; 422/943, 102, 104

(56) References Cited

U.S. PATENT DOCUMENTS

| | | |
|---|---|---|
| 4,116,777 * | 9/1978 | Takatsy et al. . |
| 4,390,403 | 6/1983 | Batchelder . |
| 4,908,112 | 3/1990 | Pace . |
| 5,126,022 | 6/1992 | Soane et al. . |
| 5,252,294 * | 10/1993 | Kroy et al. . |
| 5,364,790 | 11/1994 | Atwood et al. . |
| 5,475,610 | 12/1995 | Atwood et al. . |
| 5,498,392 | 3/1996 | Wilding et al. . |
| 5,571,410 | 11/1996 | Swedberg et al. . |
| 5,585,069 | 12/1996 | Zanzucchi et al. . |
| 5,593,838 | 1/1997 | Zanzucchi et al. . |

(List continued on next page.)

FOREIGN PATENT DOCUMENTS

| | | |
|---|---|---|
| 0 542 422 * | 5/1993 | (EP) . |
| WO 9604547 | 2/1996 | (WO) . |
| WO 9702357 | 1/1997 | (WO) . |
| 98/05424 * | 2/1998 | (WO) . |

OTHER PUBLICATIONS

Woolley et al. 'Functional Integration of PCR Amplification and Capillary Electrophoresis in a Microfabricated DNA Analysis Device.' Anal. Chem. vol. 68 (1996) pp. 4081–4086.*

Dasgupta, P.K. et al., "Electroosmosis: A Reliable Fluid Propulsion System for Flow Injection Analysis," *Anal. Chem.* 66:1762–1798 (1994).

Jacobson, S.C. et al., "Fused Quartz Substrates for Microchip Electrophoresis," *Anal. Chem.* 67:2059–2063 (1995).

Manz, A. et al., "Electroosmotic pumping and electrophoretic separations for miniaturized chemical analysis systems," *J. Micromech. Microeng.* 4:257–265 (1994).

Ramsey, J.M. et al., "Microfabricated chemical measurement systems," *Nature Med.* 1:1093–1096 (1995).

Seiler, K. et al., "Planar Glass Chips for Capillary Electrophoresis: Repetitive Sample Injection, Quantitation, and Separation Effiency," *Anal. Chem.* 65:1481–1488 (1993).

Seiler, K. et al., "Electroosmotic Pumping and Valveless Control of Fluid Flow Within a Manifold of Capillaries on a Glass Chip," *Anal. Chem.* 66:3485–3491 (1994).

Primary Examiner—William H. Beisner
(74) Attorney, Agent, or Firm—Matthew B. Murphy; Gulshan H. Shaver

(57) ABSTRACT

Reactor systems that include a reaction receptacle that includes a plurality of reservoirs disposed in the surface of a substrate. The reactor system also typically includes a temperature control element having at least a first heat exchanger thermally coupled to it. The heat exchanger is, in turn, disposed within the at least one of the reservoirs whereby the heat exchanger transfers heat to or from a fluid disposed within the reservoir, which heat is conducted to or from the temperature control element.

28 Claims, 5 Drawing Sheets

U.S. PATENT DOCUMENTS

| | | |
|---|---|---|
| 5,603,351 | 2/1997 | Cherukuri et al. . |
| 5,635,358 | 6/1997 | Wilding et al. . |
| 5,637,469 | 6/1997 | Wilding et al. . |
| 5,699,157 | 12/1997 | Parce . |
| 5,750,015 | 5/1998 | Soane et al. . |
| 5,779,868 | 7/1998 | Parce et al. . |
| 5,800,690 | 9/1998 | Chow et al. . |
| 5,842,787 | 12/1998 | Kopf-Sill et la. . |
| 5,852,495 | 12/1998 | Parce . |
| 5,869,004 | 2/1999 | Parce et al. . |
| 5,876,675 | 3/1999 | Kennedy . |
| 5,880,071 | 3/1999 | Parce et al. . |
| 5,882,465 | 3/1999 | McReynolds . |
| 5,885,470 | 3/1999 | Parce et al. . |
| 5,919,622 * | 7/1999 | Macho et al. . |
| 5,985,555 * | 11/1999 | Bertling . |
| 5,989,402 * | 11/1999 | Chow et al. . |

* cited by examiner

INTEGRATED DEVICES AND SYSTEMS FOR PERFORMING TEMPERATURE CONTROLLED REACTIONS AND ANALYSES

BACKGROUND OF THE INVENTION

The biological and chemical sciences, much like the electronics industry, have sought to gain advantages of cost, speed and convenience through miniaturization. The field of microfluidics has gained substantial attention as a potential solution to the problems of miniaturization in these areas, where fluid handling capabilities are often the main barrier to substantial miniaturization.

For example, U.S. Pat. Nos. 5,304,487, 5,498,392, 5,635,358, 5,637,469 and 5,726,026, all describe devices that include mesoscale flow systems for carrying out a large number of different types of chemical, and biochemical reactions and analyses.

Published international patent application No. WO 96/04547 to Ramsey describes microfluidic devices that incorporate electrokinetic means for moving fluids or other materials through interconnected microscale channel networks. Such systems utilize electric fields applied along the length of the various channels, typically via electrodes placed at the termini of the channels, to controllably move materials through the channels by one or both of electroosmosis and electrophoresis. By modulating the electric fields in intersecting channels, one can effectively control the flow of material at intersections. This creates a combination pumping/valving system that requires no moving parts to function. The solid state nature of this material transport system allows for simplicity of fabricating microfluidic devices, as well as simplified and more accurate control of fluid flow.

Published international patent application No. 98/00231 describes the use of microfluidic systems in performing high throughput screening of large libraries of test compounds, e.g., pharmaceutical candidates, diagnostic samples, and the like. By performing these analyses microfluidically, one gains substantial advantages of throughput, reagent consumption, and automatability.

Another advantage of microfluidic systems is to provide the ability to integrate large numbers of different operations in a single "lab-on-chip" device, for performing both upstream and downstream processing of reactants for analysis and/or synthesis. For example, International Patent Application No. PCT/US98/17910, filed Aug. 27, 1998, describes devices and systems that elegantly control and monitor temperature within microfluidic systems by applying electric currents to fluids to generate heat therein, as well as measure solution conductivity as a measure of fluid temperature.

Despite the substantial advantages made in the field of microfluidics, improvements are always desirable which allow more simplistic integration of analytical and synthetic operations. The present invention meets these and a variety of other needs.

SUMMARY OF THE INVENTION

In a first aspect, the present invention provides a reactor system. The reactor system comprises a reactor element with a plurality of reservoirs disposed in a surface of a substrate, a heating element, and at least a first heat exchanger disposed within at least one of the plurality of reservoirs. The heat exchanger is in thermal communication with the heating element.

Another aspect of the present invention is a method of performing temperature dependent reactions. The method comprises providing a reactor system which is composed of a plurality of reservoirs disposed in a body structure. The reservoirs are fluidly connected to a microscale channel network disposed in an interior portion of the body structure. A temperature control element, and a heat exchanger thermally coupled with the temperature control element are also included. The heat exchanger is inserted into the reservoir. A first reactant is placed into at least one of the reservoirs. The temperature within the reservoirs is controlled by modulating a temperature. The at least one reactant is transported from the at least first reservoir into the microscale channel network.

BRIEF DESCRIPTION OF THE FIGURES

FIG. 1C illustrates the insertion of the heat exchanger portion of the system into the reservoirs of the reaction receptacle.

DETAILED DESCRIPTION OF THE INVENTION

Figures 1A, 1B:
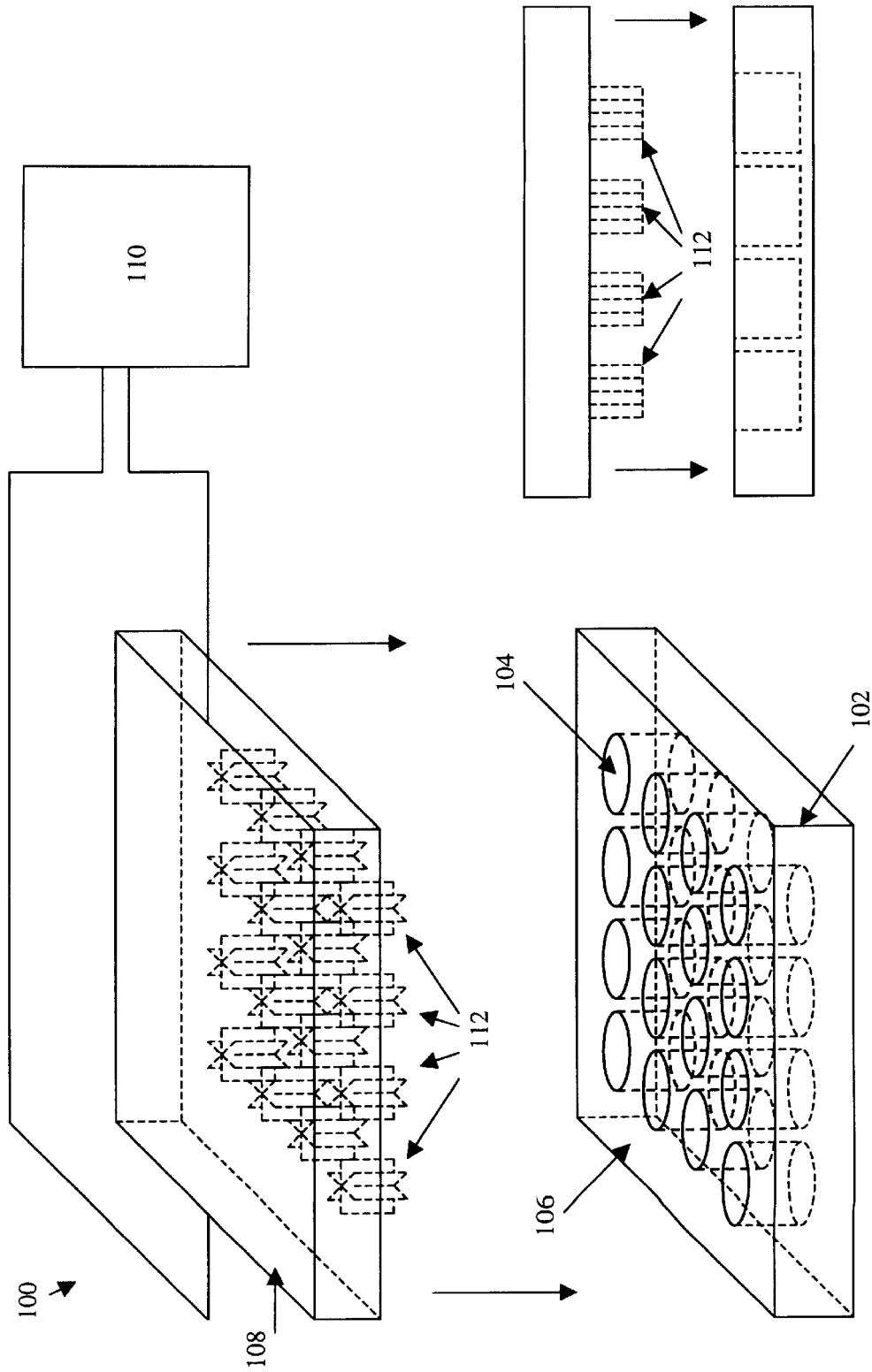
FIGS. 1A–1C schematically illustrate a temperature controlled reactor system of the present invention from a perspective view (FIG. 1A) and a side view (FIG. 1B).

The present invention generally provides novel systems for carrying out integrated reactions and analyses where those reactions and/or analyses require accurate temperature control. Further, by carrying out these operations in the microfluidic regime, such operations have increased throughput with decreased reagent requirements.

In a first aspect, the present invention provides a reactor system that includes a reaction receptacle that includes a plurality of reservoirs disposed in the surface of a substrate. The reactor system also typically includes a temperature control element having at least a first heat exchanger thermally coupled to it. The heat exchanger is, in turn, disposed within the at least one of the reservoirs whereby the heat exchanger transfers heat to or from a fluid disposed within the reservoir, which heat is conducted to or from the temperature control element.

As noted above, the reaction receptacle portion of the present invention typically includes a plurality of fluid reservoirs disposed in the surface of a single substrate, in order to permit the performance of a number of different reactions simultaneously, or over time, without the need for a number of different receptacles. The reservoirs described herein generally have relatively small volumes to permit very small reaction volumes. For example, preferred reservoirs typically have a fluid capacity of less than or equal to about 200 µl, generally, less than or equal to about 100 µl. In order to provide such volumes, the reservoirs are typically from about 1 mm to about 10 mm deep and between about 0.2 mm and 10 mm in cross-section, e.g., diameter or on an edge. For example, in particularly preferred aspects, reservoirs are circular having a diameter of between about 0.2 mm and about 5 mm, and a depth between about 1 mm and about 10 mm.

The substrate in which the reservoirs are disposed is typically planar in structure and is fabricated from a material that is substantially inert with respect to the reactions being carried out in the reservoirs. Preferred substrate materials include, e.g., silica-based substrates, such as glass, quartz, fused silica, silicon, and the like, polymeric substrates, e.g., polystyrene, polypropylene, acrylic polymers, e.g., polymethylmethacrylate, polycarbonate, polytetrafluoroethylene, polyvinylchloride, polydimethylsiloxane, polysulfone, polystyrene, polymethylpentene, polypropylene, polyethylene, polyvinylidine fluoride, and acrylonitrile-butadiene-styrene copolymer.

Also as noted above, in preferred aspects, the reaction receptacle has integrated within it, the capability to carry out one or more additional analytical or other operations. This is carried out by the incorporation within the substrate/reaction receptacle of at least a first microfluidic channel network linking one or more of the plurality of reservoirs disposed in the substrate.

Typically, substrates containing both reservoirs and integrated channel networks are fabricated from at least two different substrate layers, where one layer includes a plurality of apertures disposed through it which correspond to the reservoirs when the substrate layers are mated together to form the assembled reaction receptacle. The channel network is typically defined between the two substrate layers as a series of grooves either fabricated into a surface of one or both of the substrate layers, or is defined by an additional layer applied to or disposed upon the surface of one or both of the substrate layers. When the substrate layers are mated together, the grooves fabricated into the surface are sealed to define a plurality of fluid conduits or channels. These channels are positioned such that they will be in fluid communication with one or more of the apertures disposed through one or both of the substrate layers, when the substrate layers are mated together. In the finished product, this results in a plurality of reservoirs disposed in the surface of the assembled substrate, where the reservoirs are in fluid communication with the channel network disposed within the interior of the assembled substrate.

Typically, the channel network may include any of a number of different channel geometries, depending upon the operation that is to be carried out by the overall system. For example, published International Patent Application No. WO 98/49548 describes microfluidic devices that include preferred channel geometries for performing separation analysis of multiple samples along a single separation channel, by individually transporting those samples from separate, integrated reservoirs into the separation channel, and electrophoresing the samples down that channel. Published International Patent Application No. WO 98/00231, on the other hand describes channel geometries that are useful in performing high throughput screening operations. Each of these published applications is hereby incorporated herein by reference.

In particularly preferred aspects, the channel networks include at least two intersecting microscale channels disposed within the interior of the substrate. As used herein, the term "microscale" or "microfabricated" generally refers to structural elements or features of a device which have at least one fabricated dimension in the range of from about 0.1 $\mu$m to about 500 $\mu$m. Thus, a device referred to as being microfabricated or microscale will include at least one structural element or feature having such a dimension. When used to describe a fluidic element, such as a passage, channel, chamber or conduit, the terms "microscale," "microfabricated" or "microfluidic" generally refer to one or more fluid passages, channels, chambers or conduits which have at least one internal cross-sectional dimension, e.g., depth, width, length, diameter, etc., that is less than 500 $\mu$m, and typically between about 0.1 $\mu$m and about 500 $\mu$m. In the devices of the present invention, the microscale channels or chambers preferably have at least one cross-sectional dimension between about 0.1 $\mu$m and 200 $\mu$m, more preferably between about 0.1 $\mu$m and 100 $\mu$m, and often between about 0.1 $\mu$m and 20 $\mu$m. Accordingly, the microfluidic devices or systems prepared in accordance with the present invention typically include at least one microscale channel, usually at least two intersecting microscale channels, and often, three or more intersecting channels disposed within a single body structure. Channel intersections may exist in a number of formats, including cross intersections, "T" intersections, or any number of other structures whereby two channels are in fluid communication.

The reactor systems described herein also typically include a temperature control element that is in thermal communication with the reservoirs and preferably, in thermal communication with fluid disposed within those reservoirs. As used herein, the phrase "within thermal communication" refers to a connection between the reservoirs and preferably a fluid within the reservoirs, and the temperature control element, which allows for the efficient transfer of heat between the reservoirs (or fluid) and the temperature control element.

In simple embodiments, the temperature control element comprises a heating element, such as a resistive heater, which can be adjusted to any of a number of preselected temperatures above ambient temperature. Such simple heating elements are well known in the art, and are useful in those reactions/operations that require or benefit from elevated temperatures, e.g., above ambient.

In certain aspects, however, additional temperature control is desirable, e.g., where a reaction benefits from temperatures below ambient, or requires a number of different reaction temperatures over time for optimal performance. For example, often, reactions may require a varying temperature profile over time, to optimize for a number of different reactions during that time. Examples of these reactions include thermal cycling reactions, e.g., for performing nucleic acid amplification reactions, and the like. In such cases, thermoelectric temperature control elements, e.g., peltier heaters/coolers are preferred as the temperature control elements.

In accordance with the present invention, one or more heat exchangers are is also used to translate a requisite level of heat between the reservoirs of the reaction receptacle and the temperature control element. In particular, one or more heat exchangers is typically provided in thermal communication with the temperature control element, and positioned such that the heat exchanger is disposed in, or is insertable into one or more of the reservoirs, either separately, or simultaneously, so that the heat exchanger is also in thermal communication with a fluid in the reservoir(s).

Heat exchangers can comprise any of a variety of thermally conductive materials, including thermally conductive metals, i.e., copper, aluminum, platinum, and the like. In particularly preferred aspects, the heat exchanger comprises a material that is substantially inert to the conditions of the reaction that is to be performed. As such, aluminum, copper, platinum and ceramic heat exchangers are typically preferred, but other efficient heat exchanging materials can also be used, such as high-carbon polymer materials.

The systems described herein, in addition to benefiting from integratability and automatability, also provide benefits in terms of providing for rapid adjustment of fluid temperatures. Specifically, because the reservoirs have relatively small volumes, e.g., 200 $\mu$l or less, and the heat exchangers have efficient thermal transfer properties as a result of their structures and materials, fluids within the reservoirs can be heated substantially faster than in systems employing external temperature control sources, e.g., test tubes placed in heating blocks, water baths, thermal cyclers, and the like. In particular, typical heating systems require several minutes to heat materials to 100° C., in standard test tubes, microfuge tubes and the like. For microfluidic devices and fluids contained in the reservoirs of such devices, one would expect similar, or even longer temperature transition times. Specifically, where a the temperature of a microfluidic device reservoir is controlled by placing the entire device on a heating element, the relatively large amount of substrate as compared to the reservoir volume makes changes in temperature for the reservoir much slower.

The heat exchangers are generally coupled to a surface of the temperature control element, and are shaped or configured so that at least a portion of the heat exchanger fits within the typically narrow dimensions of the reservoirs. Thus, the portion of the heat exchanger that inserts into the reservoir will typically comprise dimensions that are similar to, but smaller than the dimensions of the reservoirs. For example, in the case of the preferred reservoir dimensions described above, it will be appreciated that the dimensions of the heat exchanger portions will be from about 0.1 to about 8 mm wide, and between about 0.5 mm and 8 mm deep. As used herein, the dimensions provided for the portions of the heat exchangers denote the boundaries of the space occupied by the heat exchanger portion, rather than providing an absolute measure of the structure, mass or shape of the heat exchanger. For example, where a heat exchanger comprises, e.g., a lattice or coil of thermally conductive material, the boundary dimensions of that lattice or coil fit within the above described criteria. One of the goals of these structures is to provide rapid, uniform temperature control across the full volume of a particular reservoir.

In order to optimize thermal transfer between fluid placed into the reservoirs and the heat exchangers, and consequently, the temperature control element, the heat exchangers are typically provided with a relatively large surface areas. This is generally accomplished by providing the heat exchanger with a structure that increases the surface area across which thermal transfer may occur. Such structures may include heat exchangers that are open cylinders which insert into the fluid reservoir of the device and provide both inside and outside surfaces of the cylinder for thermal transfer. Optionally, the heat exchangers may include additional structural elements to enhance thermal transfer, including, e.g., fins, spines, ribs or the like. Alternative structures may also be employed which provide such enhanced surface areas, including, e.g., coiled structures and/or sintered structures fabricated from thermally conductive materials, e.g., metals, ceramics, and thermally conductive polymers, as well as randomly formed structures, e.g., crumpled wires, etc. All of these types of structures have enhanced surface areas for thermal transfer.

In addition to there increased surface areas, these structures are readily fabricated so that their boundaries are similar to, but slightly less than the dimensions of the reservoirs into which they fit, as described above. By dimensioning the heat exchangers in this way, one can optimize temperature control within the reaction reservoir by minimizing the distance between any portion of the fluid and a portion of the heat exchanger, thereby minimizing temperature gradients through the reservoir. In microscale systems, this is particularly important as the substrate in which the reservoirs are disposed will function as a heat sink, rapidly cooling fluid within the reservoirs, and particularly near the walls of the reservoirs. Larger distances between the heat exchanger and the walls will result in more substantial temperature gradients within the reservoirs, resulting in some fluids being either too warm or too cool.

Figure 1C:
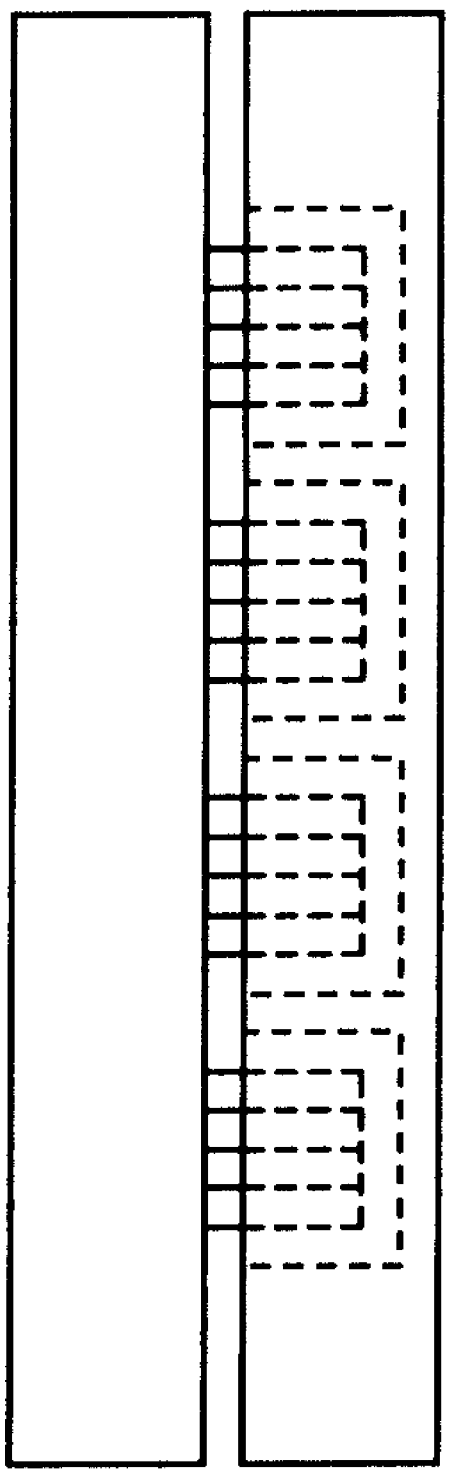
Figure 3:
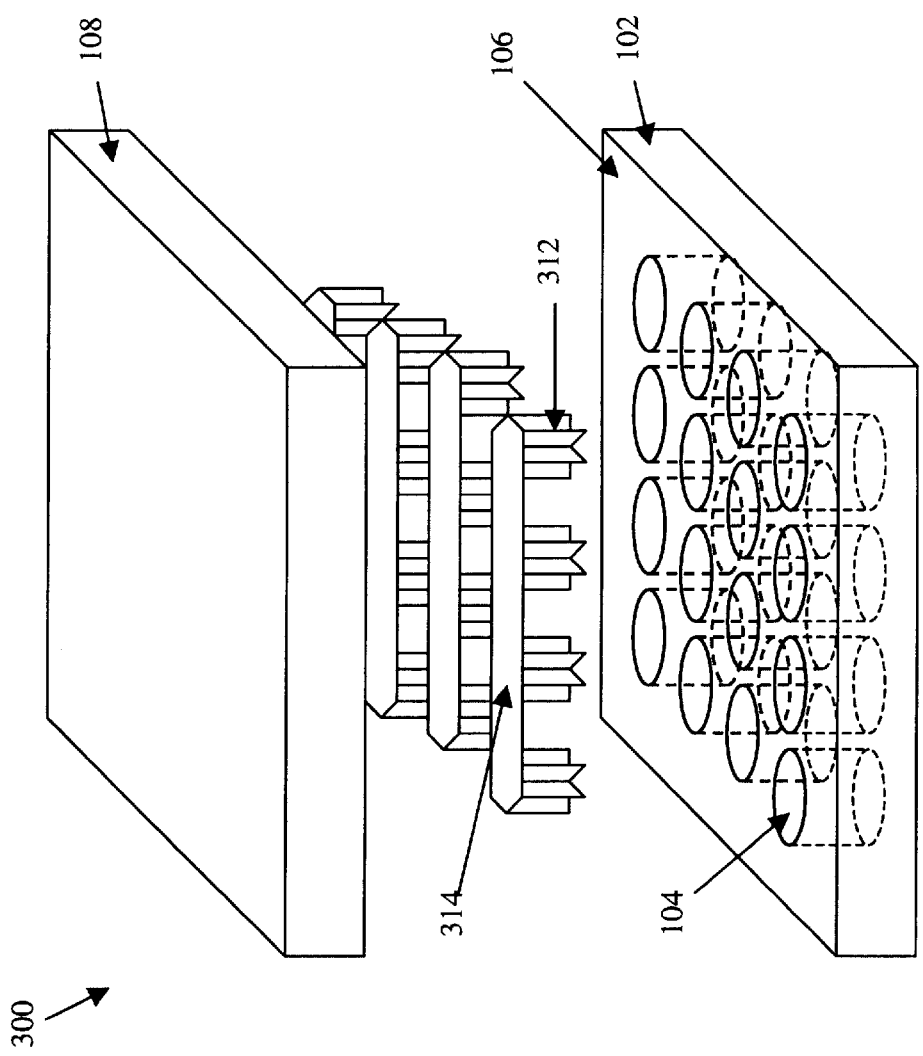
FIG. 3 schematically illustrates a system similar to that shown in FIG. 1, but employing heat exchanger arrays.

In the case of systems that include temperature control in multiple reservoirs, the heat exchanger portions of the overall system may be fabricated separately and thermally linked to the temperature control element, e.g., as shown in FIGS. 1A–1C. However, in some preferred aspects, the heat exchanger portions that contact multiple different reservoirs are part of a single heat exchanger array that is fabricated as a single unit and thermally linked to the temperature control element as a single unit. An example of an integrated heat exchanger array for controlling temperature in multiple reservoirs is shown in FIG. 3. In particular, the system 300, again includes the reaction receptacle 102 having a plurality of reservoirs 104 disposed in its upper surface 106. In the system shown in FIG. 3, however, the thermal transfer structures 312 that insert into each of several reservoirs contacting the fluid therein, are attached to and preferably fabricated as a single component with each other as an array of heat exchangers 314. One or more of these arrays 314 is then thermally coupled to the temperature control element 108. Of course, the heat exchanger array can be configured to insert into any number of reservoirs simultaneously. Further, in the case of electrokinetic material transport systems, arrays can be configured to contact only a group of reservoirs that will be under the same applied electric fields for a given operation, again allowing their use as electrodes. Specifically, where multiple electrodes are under the same applied electric potentials during the entire operation, they can also be bridged by a common heat exchanger/electrode.

In some cases, the desired reactions are performed as a prelude to an additional analytical step. For example, often it is desirable to subject reaction components to a subsequent analytical operation or reaction. For example, reaction products may be subjected to a separation analysis to determine if a desired component was produced in the reaction. Alternatively, reaction products may be combined with further reactants, which may have interfered with the previous step of the reaction. Accordingly, in preferred aspects, the reservoirs in which the desired reactions are carried out are disposed at termini of a channel network that is disposed within the substrate or body structure, as described above. Subsequent operations on a given sample may then be performed at different locations within the reaction receptacle, e.g., another reservoir or one or more channels coupled to the reservoirs, by transporting the sample material from the reservoir to the other location, through the interconnected channel network.

Movement of material from the reservoirs, through the channels can be accomplished by a number of means, including, e.g., application of pressure differentials and/or electric fields across channels, to drive material movement through those channels. Pressure differentials may be applied across channels, by simply elevating or lowering the pressure at one terminus of a given channel relative to another terminus of that channel. For example, one can apply a vacuum at one end of a channel to draw fluid or other materials through that channel. Alternatively, one may apply a positive pressure to a sample reservoir at one end of a channel to push that sample into and through the connected channel. Alternatively, microfabricated pumps and valves may be incorporated into the channel network to drive and direct material movement.

In some preferred aspects, material is moved through the channels of the system through the controlled application of electric fields across the lengths of different channel segments. This type of material transport is referred to herein as "electrokinetic material transport." As used herein, "electrokinetic material transport systems" include systems which transport and direct materials within an interconnected channel and/or chamber containing structure, through the application of electrical fields to the materials, thereby causing material movement through and among the channel and/or chambers, i.e., cations will move toward the negative electrode, while anions will move toward the positive electrode.

Such electrokinetic material transport and direction systems include those systems that rely upon the electrophoretic mobility of charged species within the electric field applied to the structure. Such systems are more particularly referred to as electrophoretic material transport systems. Other electrokinetic material direction and transport systems rely upon the electroosmotic flow of fluid and material within a channel or chamber structure which results from the application of an electric field across such structures. In brief, when a fluid is placed into a channel which has a surface bearing charged functional groups, e.g., hydroxyl groups in etched glass channels or glass microcapillaries, those groups can ionize. In the case of hydroxyl functional groups, this ionization, e.g., at neutral pH, results in the release of protons from the surface and into the fluid, creating a concentration of protons at near the fluid/surface interface, or a positively charged sheath surrounding the bulk fluid in the channel. Application of a voltage gradient across the length of the channel, will cause the proton sheath to move in the direction of the voltage drop, i.e., toward the negative electrode.

"Controlled electrokinetic material transport and direction," as used herein, refers to electrokinetic systems as described above, which employ active control of the voltages applied at multiple, i.e., more than two, electrodes. Rephrased, such controlled electrokinetic systems concomitantly regulate voltage gradients applied across at least two intersecting channels. Controlled electrokinetic material transport is described in Published PCT Application No. WO 96/04547, to Ramsey, which is incorporated herein by reference in its entirety for all purposes. In particular, the preferred microfluidic devices and systems described herein, include a body structure which includes at least two intersecting channels or fluid conduits, e.g., interconnected, enclosed chambers, which channels include at least three unintersected termini. The intersection of two channels refers to a point at which two or more channels are in fluid communication with each other, and encompasses "T" intersections, cross intersections, "wagon wheel" intersections of multiple channels, or any other channel geometry where two or more channels are in such fluid communication. An unintersected terminus of a channel is a point at which a channel terminates not as a result of that channel's intersection with another channel, e.g., a "T" intersection. In preferred aspects, the devices will include at least three intersecting channels having at least four unintersected termini. In a basic cross channel structure, where a single horizontal channel is intersected and crossed by a single vertical channel, controlled electrokinetic material transport operates to controllably direct material flow through the intersection, by providing constraining flows from the other channels at the intersection. For example, assuming one was desirous of transporting a first material through the horizontal channel, e.g., from left to right, across the intersection with the vertical channel. Simple electrokinetic material flow of this material across the intersection could be accomplished by applying a voltage gradient across the length of the horizontal channel, i.e., applying a first voltage to the left terminus of this channel, and a second, lower voltage to the right terminus of this channel, or by allowing the right terminus to float (applying no voltage). However, this type of material flow through the intersection would result in a substantial amount of diffusion at the intersection, resulting from both the natural diffusive properties of the material being transported in the medium used, as well as convective effects at the intersection.

In controlled electrokinetic material transport, the material being transported across the intersection is constrained by low level flow from the side channels, e.g., the top and bottom channels. This is accomplished by applying a slight voltage gradient along the path of material flow, e.g., from the top or bottom termini of the vertical channel, toward the right terminus. The result is a "pinching" of the material flow at the intersection, which prevents the diffusion of the material into the vertical channel. The pinched volume of material at the intersection may then be injected into the vertical channel by applying a voltage gradient across the length of the vertical channel, i.e., from the top terminus to the bottom terminus. In order to avoid any bleeding over of material from the horizontal channel during this injection, a low level of flow is directed back into the side channels, resulting in a "pull back" of the material from the intersection.

In addition to pinched injection schemes, controlled electrokinetic material transport is readily utilized to create virtual valves which include no mechanical or moving parts. Specifically, with reference to the cross intersection described above, flow of material from one channel segment to another, e.g., the left arm to the right arm of the horizontal channel, can be efficiently regulated, stopped and reinitiated, by a controlled flow from the vertical channel, e.g., from the bottom arm to the top arm of the vertical channel. Specifically, in the 'off' mode, the material is transported from the left arm, through the intersection and into the top arm by applying a voltage gradient across the left and top termini. A constraining flow is directed from the bottom arm to the top arm by applying a similar voltage gradient along this path (from the bottom terminus to the top terminus). Metered amounts of material are then dispensed from the left arm into the right arm of the horizontal channel by switching the applied voltage gradient from left to top, to left to right. The amount of time and the voltage gradient applied dictates the amount of material that will be dispensed in this manner.

Although described for the purposes of illustration with respect to a four way, cross intersection, these controlled electrokinetic material transport systems can be readily adapted for more complex interconnected channel networks, e.g., arrays of interconnected parallel channels.

In the case of electrically driven material movement, it is generally preferred to provide electrodes in contact with the channels of the device to deliver potential gradients across the length of the channels. This, in turn, is typically accomplished by placing electrodes into contact with fluid disposed within the reservoirs at the termini of these channels.

In particularly preferred aspects, the heat exchangers are fabricated from a material that is both thermally and electrically conductive, so that they can function as both a heat exchanger and an electrode, when placed into a fluid filled reservoir. The electrodes/heat exchangers are then separately and operably coupled to an electrical controller which controls the application of electric potentials to the electrodes/heat exchangers to drive material movement through the channels in a controlled manner. Coupling of the electrodes/heat exchangers to the electrical controller is generally accomplished in a manner so as not to interfere with he thermal transfer between the heat exchanger portion and the temperature control element. For example, electrical leads may be patterned on the surface of the temperature control element and in contact with the heat exchanger/electrode. Alternatively, wires may be disposed through the temperature control element to provide electrical coupling between the electrodes/heat exchangers and the electrical controller.

In alternate aspects, electrodes may be separate from the heat exchangers and electrically connected to a reservoir via a separate fluid filled port and salt bridge configuration that is connected to the reservoir, e.g., as described in Published International Application No. WO 98/00231, which is incorporated herein by reference. In particular, the heat exchanger is inserted into a sample material containing reservoir, while the electrode is placed into an adjacent well that is ionically linked to the sample reservoir via a salt bridge, or other connection having reduced fluid permeability.

One example of an overall reactor system in accordance with the present invention is illustrated in FIGS. 1A, 1B and 1C. As shown, the overall system 100 includes a reaction receptacle 102 that includes a plurality of reservoirs 104 extending down from the upper surface 106 of the receptacle 102. The system also includes a temperature control element 108, which, as shown, comprises an electrically controlled temperature control element, e.g., a resistive heater or peltier device, that is operably coupled to a temperature controller 110 which provides electric current to the temperature control element 108 and optionally receives feedback signals, to change and control the temperature of element 108. The system further includes a plurality of heat exchangers 112, which are in thermal communication with the temperature control element 108, and are positioned so that they can be inserted into separate reservoirs 104 in the receptacle 102, to allow efficient thermal transfer between material, e.g., fluid, in the reservoirs 104 and the temperature control element 108. A side view of these elements is shown in FIG. 1B. FIG. 1C illustrates the insertion of the heat exchangers 112 into the reservoirs 104.

Although illustrated as a plurality of separate heat exchangers, it will be appreciated that the heat exchangers may be provided as arrays of connected heat exchangers where circumstances permit. For example, where reservoirs need not be electrically or thermally isolated from one another, metallic heat exchanger arrays can be fabricated that extend simultaneously into multiple reservoirs. Where it is desirable for reservoirs to be electrically isolated from one another, e.g., where materials are electrokinetically transported through a channel network coupled to the reservoirs, then individual heat exchangers are preferred, but non electrically conductive heat exchanger arrays are also useful.

Figure 2:
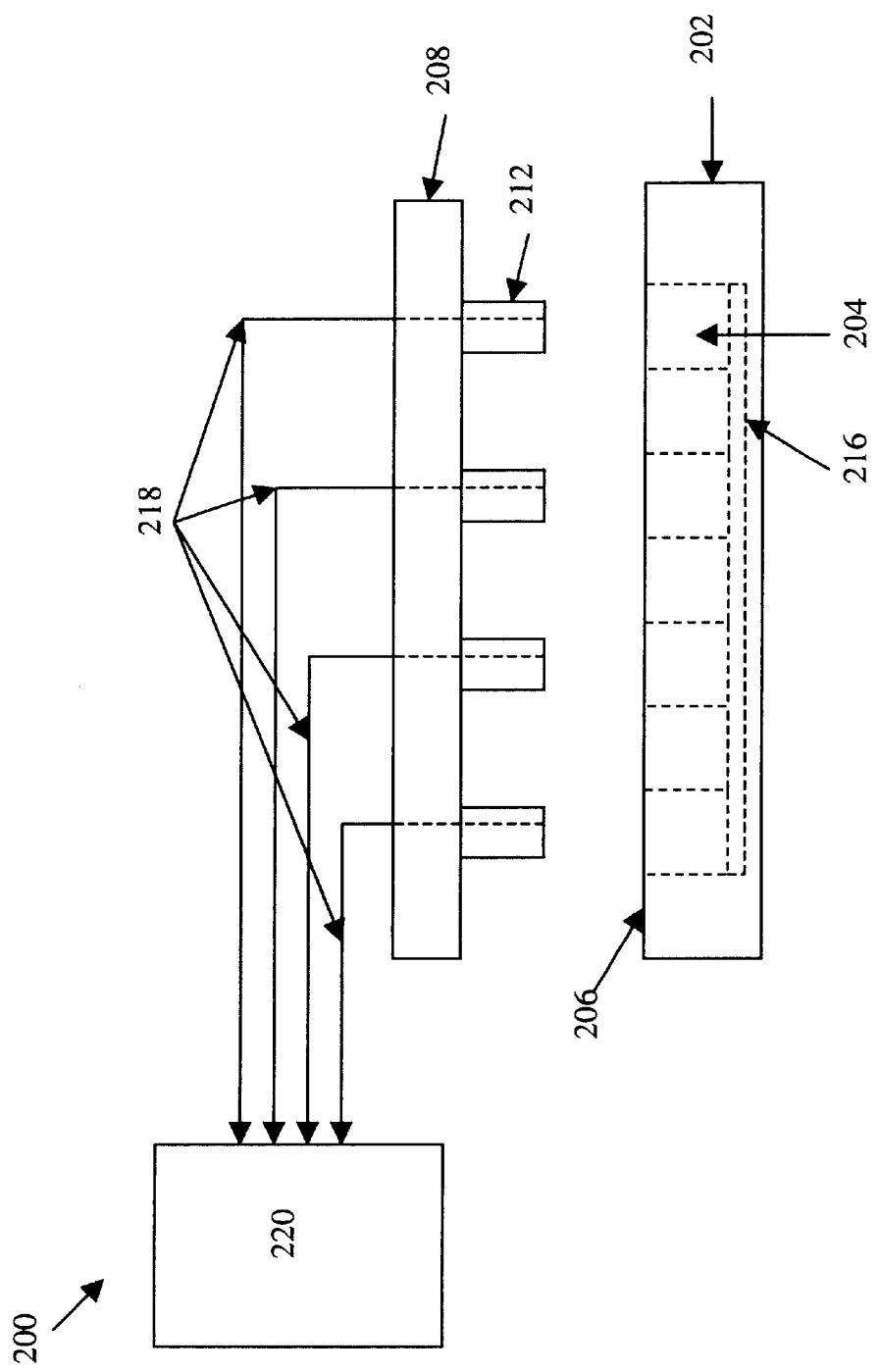
FIG. 2 schematically illustrates an alternate embodiment of the systems of the invention in which the heat exchangers also function as electrodes for driving material transport in an interconnected channel structure within the reaction receptacle.

FIG. 2A illustrates a side view of a system of the present invention in which the heat exchangers also function as electrodes to drive the movement of material within the system. In particular, as shown, the system 200 again includes a receptacle 202 which comprises a plurality of reservoirs 204 extending from the upper surface 206f the receptacle 202. As shown, however, the receptacle 202 also includes a channel network 216 disposed within the interior of the receptacle 202, and which connects the reservoirs 204 of the receptacle 202. FIG. 2B illustrates an exemplary receptacle 202 containing an integrated channel network 216 from a perspective view.

The heat exchangers 212 are again in thermal communication with the temperature control element 208, but are also in electrical communication with an electrical controller 220 which is capable of delivering varying voltages and/or currents to each of the separate heat exchangers causing them to function as heat exchangers/electrodes. Examples of electrical controllers for use in driving material movement are described in U.S. Pat. No. 5,800,690, which is incorporated herein by reference. In optional aspects, a single electrical controller is used to control the application of current and/or voltage to each of the electrodes, as well as providing the electrical current that controls the temperature control element.

Examples of such instruments are described in Published International Application No. WO 98/05424. Briefly, these instruments typically include a base unit, which optionally houses the control elements for the instrument, e.g., electrical power supplies, optical detection systems, and the like. The base unit typically includes a nesting site or well that is configured to receive the reactor element, e.g., the microfluidic device. The base unit also typically includes an element for interfacing with the reactor element, e.g., a "reactor element interface component," for imparting energy to the reactor element, e.g., thermal, light, electrical energy or the like. In the case of the thermal control aspects of the present invention, the interface component typically includes at least one heat exchanger that is in thermal communication with a heating element, as described herein. The heat exchanger is typically positioned or configured on the interface component such that it can be easily inserted into at least one reservoir of the reactor element thereby contacting a fluid disposed therein. The interface element may comprise any number of optional structures, including, e.g., a clamshell structure which rotatably closes over the nesting site and reactor element to bring the heat exchanger into contact with the fluid filled reservoir. Other such structures include, e.g., press-like structures which uniformly lower over the nesting site, and will be readily apparent to one of ordinary skill in the art upon reading this disclosure.

As noted previously, the devices and systems of the present invention are typically employed where one wishes to perform a temperature dependent reaction within a particularly limited volume, e.g., less than 100 $\mu$l. These devices and systems are particularly useful where one further wishes to perform additional operations on the materials that are subjected to the temperature dependent reactions. In one aspect, the devices and systems of the invention are particularly suited for performing integrated nucleic acid analyses which require a temperature dependent reaction prior to an analysis step. For example, where one wishes to determine whether a given sample contains a nucleic acid sequence of interest, the sample is typically subjected to an amplification reaction to select and amplify the nucleic acid sequence of interest, if present. This is generally followed by a characterization of the amplified products by, e.g., an electrophoretic separation and detection, or specific hybridization reaction, e.g., to an oligonucleotide array, to identify whether the nucleic acid of interest is present.

Figure 4:
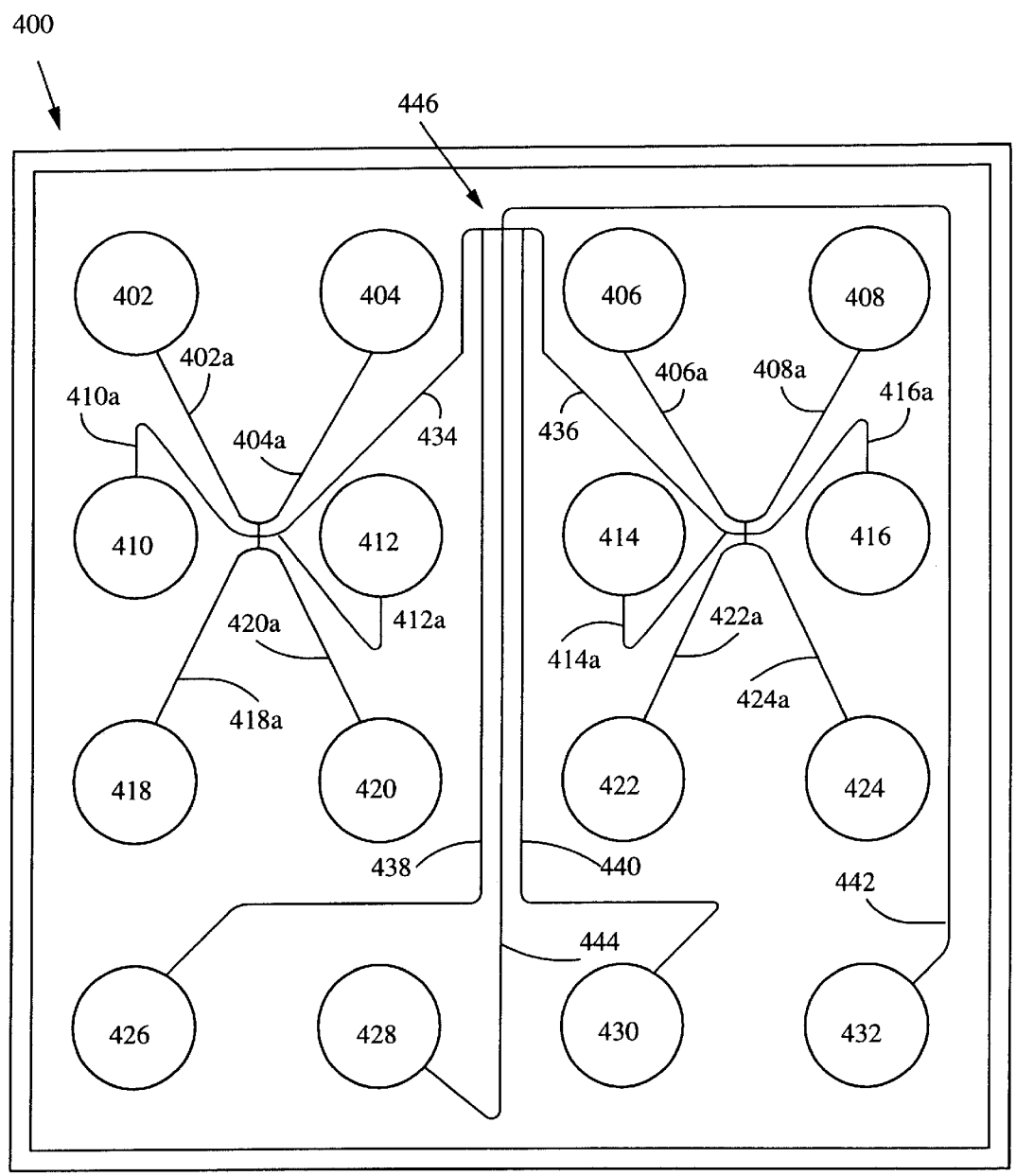
FIG. 4 shows the channel layout of a reaction receptacle/microfluidic device for carrying out temperature dependent reactions followed by analysis of the products of that reaction.

With reference to the microfluidic device/reaction receptacle shown in FIG. 4, and in the case of the systems of the present invention, this simply requires the placement of the sample material into a reservoir of the device 400, e.g., reservoir 402. In addition to the sample materials, appropriate amplification reagents are also typically added to the reservoir, e.g., anti-parallel primers that are complementary to the nucleic acid sequence of interest, nucleic acid polymerase enzyme, i.e. taq polymerase, klenow, etc., as well as appropriate buffers and salts, e.g., $MgCl_2$. The reaction mixture is then subjected to an appropriate thermal cycling profile by virtue of the temperature control element and heat exchangers placed into the reservoirs to amplify the sequence of interest using for example the polymerase chain reaction (PCR). Specifically, the temperature control element heats the contents of the reservoir to, e.g., 95° C., to melt apart double stranded nucleic acids. The mixture is then cooled to, e.g., 45° C., to allow annealing of the primer sequences to the template sequence of interest. The mixture is then heated to, e.g., 70–80° C., to allow the polymerase to extend the primer sequences along the template sequence of interest. This cycling is repeated a number of times, e.g., 30–50 times, resulting in a geometric production of copies of the sequence of interest.

Once the amplification reaction is complete, a portion of the amplified product is transported out of the reservoir 402 via channel 402a, into loading channel 434, and across the intersection 446 of channel 434 and channel 444, into channel 436. As noted above, this material transport is accomplished by applying a gradient in the electrical potential along the path of desired material movement, e.g., by applying a current between reservoir 402 and reservoir 430. Once the material has crossed the intersection 446, the potential gradient is then applied along channel 444 to inject that portion of the material at the intersection 446 into channel 444. Incorporation of an appropriate separation matrix causes nucleic acids of different molecular weight to migrate at different speeds, allowing their separation. Incorporation of a fluorescent label into the amplified product during amplification, then allows detection of that product. Because the reaction receptacle/microfluidic device includes multiple reservoirs connected to the channel network, e.g., reservoirs 402–424, multiple samples may be analyzed in series. Specifically, thermal cycling is carried out simultaneously in each of the different reservoirs 402–424. Following amplification, each sample is, in turn, injected into the main separation channel 444 of the device, substantially as described above, for separation analysis. Further, while each sample is being analyzed, the next sample is preloaded up to a point adjacent to the injection intersection 446. In particular, while the sample from reservoir 402 is separating in channel 444, the next sample, e.g., from reservoir 410, is transported through channel 410a into channel 434 and then into channel 438, without crossing the separation channel 444. Once separation of the first sample is completed, the next sample, which is already to the point adjacent to the main channel is simply shunted across the intersection 446 and injected into the main separation channel. The use of this preload function is described in detail in Published International Patent Application No. WO 98/49548, previously incorporated herein by reference.

In a similar manner, the devices and systems described herein are also particularly suited to a variety of other applications, including SDS capillary gel electrophoresis (SDS-CGE) for the characterization of proteins and other polyamino acids. In particular, prior to analysis, protein samples typically require denaturatioin in the presence of detergent at elevated temperatures, e.g., 100° C. Use of the device shown in FIG. 4 for this application has been described in, e.g., copending U.S. patent application Ser. No. 09/243,149, filed Feb. 2, 1999, now abandoned, and incorporated herein by reference. In accordance with the present invention, sample denaturation is readily carried out within the reservoirs of the receptacle/microfluidic device using the temperature control systems described above. Sample denaturation is then followed by an analytical separation within the main reaction channel 444.

Additional reactions that are temperature dependent, e.g. requiring elevated or reduced temperatures are also generally performed using the systems described herein.

All publications and patent applications are herein incorporated by reference to the same extent as if each individual publication or patent application was specifically and individually indicated to be incorporated by reference. Although the present invention has been described in some detail by way of illustration and example for purposes of clarity, it will be apparent that certain changes and modifications may be practiced within the scope of the appended claims.

What is claimed is:

1. A reactor system, comprising:
    a reactor element comprising a plurality of reservoirs disposed in a surface of a substrate;
    a heating element; and
    at least a first heat exchanger disposed within at least one of the plurality of reservoirs, the heat exchanger being in thermal communication with the heating element,
    wherein the heat exchanger comprises a plurality of fins.

2. The reactor system of claim 1, wherein the heat exchanger is electrically conductive and is operably coupled to an electrical power supply.

3. The reactor system of claim 1, further comprising an array of a plurality of heat exchangers in thermal communication with the heating element, each of the plurality of heat exchangers disposed in a separate reservoir.

4. The reactor system of claim 1, wherein the at least first heat exchanger is disposed on a solid frame that is removably positioned over the reactor element to insert the heat exchanger into the at least one of the plurality of reservoirs.

5. The reactor system of claim 4, wherein the frame is rotatably positioned over reactor element to rotate the heat exchanger into and out of the at least one of the plurality of reservoirs.

6. The reactor system of claim 1, wherein each of the plurality of reservoirs is in fluid communication with a channel network disposed within an interior region of the reactor element.

7. The reactor system of claim 1, wherein the heating element further comprises a cooling element.

8. A reactor system, comprising:
    a reactor element comprising a plurality of reservoirs disposed in a surface of a substrate;
    a heating element; and
    at least a first heat exchanger disposed within at least one of the plurality of reservoirs, the heat exchanger being in thermal communication with the heating element,
    wherein the heat exchanger comprises a coil.

9. The reactor system of claim 8, wherein the heat exchanger is electrically conductive and is operably coupled to an electrical power supply.

10. The reactor system of claim 8, further comprising an array of a plurality of heat exchangers in thermal communication with the heating element, each of the plurality of heat exchangers disposed in a separate reservoir.

11. The reactor system of claim 8, wherein the at least first heat exchanger is disposed on a solid frame that is removably positioned over the reactor element to insert the heat exchanger into the at least one of the plurality of reservoirs.

12. The reactor system of claim 11, wherein the frame is rotatably positioned over reactor element to rotate the heat exchanger into and out of the at least one of the plurality of reservoirs.

13. The reactor system of claim 8, wherein each of the plurality of reservoirs is in fluid communication with a channel network disposed within an interior region of the reactor element.

14. The reactor system of claim 8, wherein the heating element further comprises a cooling element.

15. A reactor system, comprising:
- a reactor element comprising a plurality of reservoirs disposed in a surface of a substrate;
- a heating element; and
- at least a first heat exchanger disposed within at least one of the plurality of reservoirs, the heat exchanger being in thermal communication with the heating element,
- wherein the heat exchanger comprises a scintered metal element.

16. The reactor system of claim 15, wherein the heat exchanger is electrically conductive and is operably coupled to an electrical power supply.

17. The reactor system of claim 15, further comprising an array of a plurality of heat exchangers in thermal communication with the heating element, each of the plurality of heat exchangers disposed in a separate reservoir.

18. The reactor system of claim 15, wherein the at least first heat exchanger is disposed on a solid frame that is removably positioned over the reactor element to insert the heat exchanger into the at least one of the plurality of reservoirs.

19. The reactor system of claim 18, wherein the frame is rotatably positioned over reactor element to rotate the heat exchanger into and out of the at least one of the plurality of reservoirs.

20. The reactor system of claim 15, wherein each of the plurality of reservoirs is in fluid communication with a channel network disposed within an interior region of the reactor element.

21. The reactor system of claim 15, wherein the heating element further comprises a cooling element.

22. A reactor system, comprising:
- a reactor element comprising a plurality of reservoirs disposed in a surface of a substrate;
- a heating element; and
- at least a first heat exchanger disposed within at least one of the plurality of reservoirs, the heat exchanger being in thermal communication with the heating element,
- wherein the heat exchanger comprises a randomly compressed wire.

23. The reactor system of claim 22, wherein the heat exchanger is electrically conductive and is operably coupled to an electrical power supply.

24. The reactor system of claim 22, further comprising an array of a plurality of heat exchangers in thermal communication with the heating element, each of the plurality of heat exchangers disposed in a separate reservoir.

25. The reactor system of claim 22, wherein the at least first heat exchanger is disposed on a solid frame that is removably positioned over the reactor element to insert the heat exchanger into the at least one of the plurality of reservoirs.

26. The reactor system of claim 25, wherein the frame is rotatably positioned over reactor element to rotate the heat exchanger into and out of the at least one of the plurality of reservoirs.

27. The reactor system of claim 22, wherein each of the plurality of reservoirs is in fluid communication with a channel network disposed within an interior region of the reactor element.

28. The reactor system of claim 22, wherein the heating element further comprises a cooling element.

* * * * *